United States Patent [19]

Chen et al.

[11] Patent Number: 4,694,639

[45] Date of Patent: Sep. 22, 1987

[54] ROBOTIC LAWN MOWER

[76] Inventors: Sheng K. Chen; Shi Y. Horng; I-Ting Chen, all of No. 17, Lane 32, Ta Chyuan Street, Taichung, Taiwan

[21] Appl. No.: 814,480

[22] Filed: Dec. 30, 1985

[51] Int. Cl.⁴ ............... A01D 35/00; A01D 53/08; G05B 1/00

[52] U.S. Cl. .................. 56/10.2; 56/DIG. 15; 180/79.1; 250/202

[58] Field of Search .......... 56/10.1, 10.2, 10.8, 56/16.7, 16.9, 17.5, DIG. 15; 172/2, 3, 6; 180/167, 168, 169, 79.1; 250/202; 369/44, 43, 46

[56] References Cited

U.S. PATENT DOCUMENTS

| | | | |
|---|---|---|---|
| 2,489,305 | 11/1949 | McLennan | 250/202 |
| 2,836,253 | 5/1958 | Lovell | 180/79.1 |
| 3,061,035 | 10/1962 | King | 180/79.1 |
| 3,650,097 | 3/1972 | Nokes | 56/10.2 |
| 3,789,939 | 2/1974 | Greislinger | 56/10.2 |
| 3,840,086 | 10/1974 | Burton | 180/79.1 |
| 4,354,339 | 10/1982 | Nokes | 56/10.2 |
| 4,525,823 | 6/1985 | Sugiyama et al. | 250/202 |

Primary Examiner—Gene Mancene
Assistant Examiner—John G. Weiss
Attorney, Agent, or Firm—Armstrong, Nikaido, Marmelstein & Kubovcik

[57] ABSTRACT

A lawn mower, having an engine for driving the mower itself, is provided with a memory unit of a paper-tape type for storing a route of travel for the mower and an optical reading unit for reading the stored route of travel. The paper tape is operable with a lead wheel which guides the movement of the mower, so that the paper tape is advanced when the lead wheel rotates and the route of travel of the mower is recorded on the paper tape with a writing member when the mower moves. The optical reading unit is installed in place of the writing member for operating the mower automatically. The optical reading unit reads the recorded route of travel and delivers a signal to control the direction of the lead wheel.

9 Claims, 15 Drawing Figures

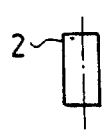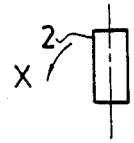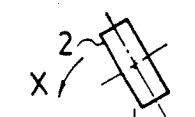
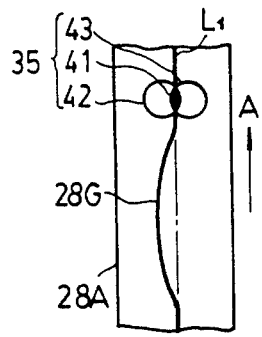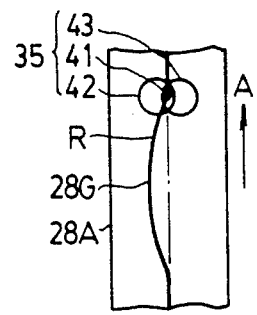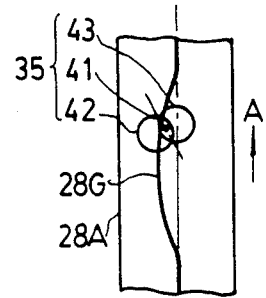
FIG. 8    FIG. 9    FIG. 10
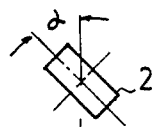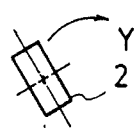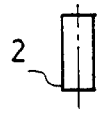
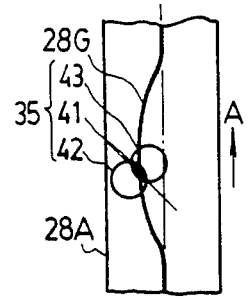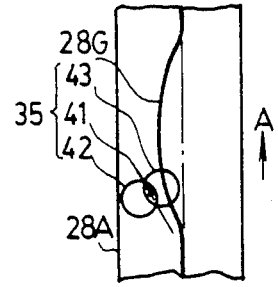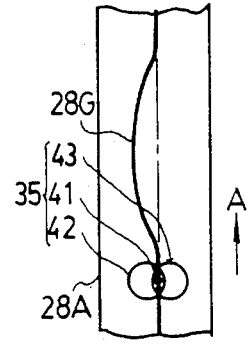
FIG. 11    FIG. 12    FIG. 13

ROBOTIC LAWN MOWER

BACKGROUND OF THE INVENTION

This invention generally relates to a lawn mower, more particularly a robotic lawn mower that is capable of mowing a lawn by itself after having been programmed.

Although a variety of lawn mowers, are commercially available ranging from small, manual types to large, motor-driven mowers, lawn mowing is still hard work for many people as all conventional lawn mowers require a person to operate and maneuver them. A riding mower provides a convenience in that the operator rides on the mower during the lawn mowing; however, the operator still has to work with the machine through the entire work process.

Therefore, this invention offers a robotic lawn mower that is capable of mowing a lawn by itself, more specifically, capable of being programmed and then later repeating the operation by itself according to what has been programmed.

SUMMARY OF THE INVENTION

This invention presents a robotic lawn mower capable of mowing a lawn by itself after having been programmed. The robotic lawn mower of this invention is generally provided with a power unit, which may be an internal combustion engine or an electric motor, for providing power for driving cutting blades and moving the mower. A reduction gear set and a driving wheel is provided for propelling the mower. A lead wheel is for leading the mower. A control unit is for controlling the movement of the mower. The control unit includes a memory unit for memorizing or recording a program of the operation. A reading unit is for reading the stored or recorded program and a control circuit is for converting the program read by the reading unit into an operation signal. A steering unit receives the operation signal and operates the lead wheel so as to lead the mower to move along a route according to the program.

In use, the robotic lawn mower of this invention is first guided by man to move or travel along a certain route over a lawn to be mowed, so as to program the mower on the route it should move along. The route, which includes the angles of turns and the length of travel in any given direction, is stored or recorded in the memory unit according to the path of travel of the lead wheel. For automatic lawn mowing, the mower is moved to the starting point to start its own operation, without being maneuvered by man, to move along the path or route recorded in the memory device, or to follow the program. The same mowing route recorded in the memory unit can be used repeatedly for mowing the same lawn.

In a preferred embodiment the memory unit includes a paper tape, which moves while the mower travels, and a writing device having a pen for marking on the paper tape the route of travel of the mower in a certain scale. The reading unit includes an optical sensor for reading the recorded route of travel or programming of the mower and for producing a certain signal representing the route of travel, of the operation of the mower. The paper tape can be any appropriate sheet material that withstands solar heat without substantially deforming, so that the mower can operate accurately during the hot summer.

Therefore it is the main object of the present invention to provide a robotic lawn mower capable of mowing a lawn by itself upon being programmed.

BRIEF DESCRIPTION OF THE DRAWINGS

FIGS. 8-13 are schematic drawings illustrating the principles of operation of the reading unit in association with the lead wheel of the robotic lawn mower of this invention.

DETAILED DESCRIPTION OF THE INVENTION

Figure 1:
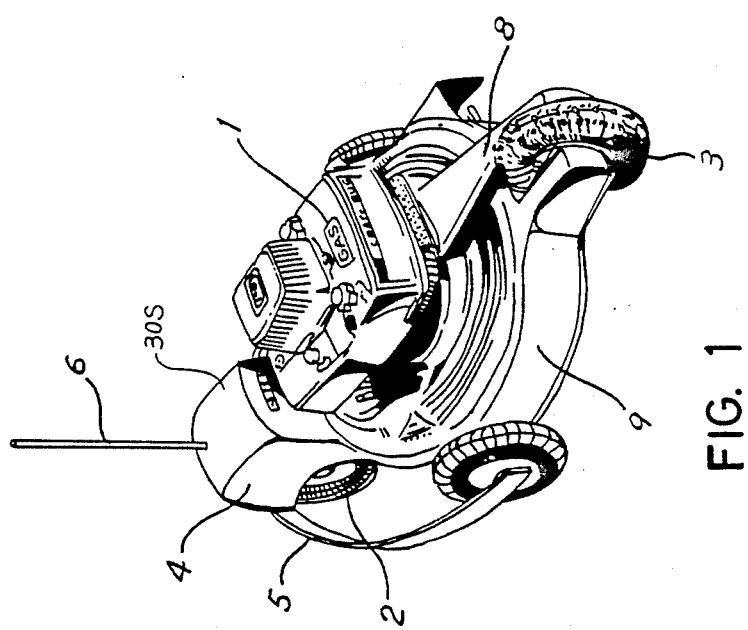
FIG. 1 is a perspective view of an embodiment of the robotic lawn mower of this invention, showing the general apparance thereof.

In FIG. 1 there is shown an embodiment of the robotic lawn mower of this invention, which is provided with a power unit 1, a lead wheel 2, a drive wheel 3, a control unit 4, safety devices 5 and 6, a reduction gear set 8, a casing 9 in which a set of cutting blades (not shown) is disposed, and a steering unit 30S. Power unit 1 may be an internal combustion engine (hereafter as engine) provided with an alternator and a rechargeable battery (not shown), wherein the alternator is mechanically coupled to the engine and capable of cranking the engine to start when energized by the battery, and also capable of charging the battery when the engine is running. A clutch, now shown, is provided to selectively transfer the rotary power produced by the engine to reduction gear set 8 which drives drive wheel 3 thus causing the entire mower to move forward. The cutting blades are also driven by the engine to rotate within casing 9.

Figure 2:
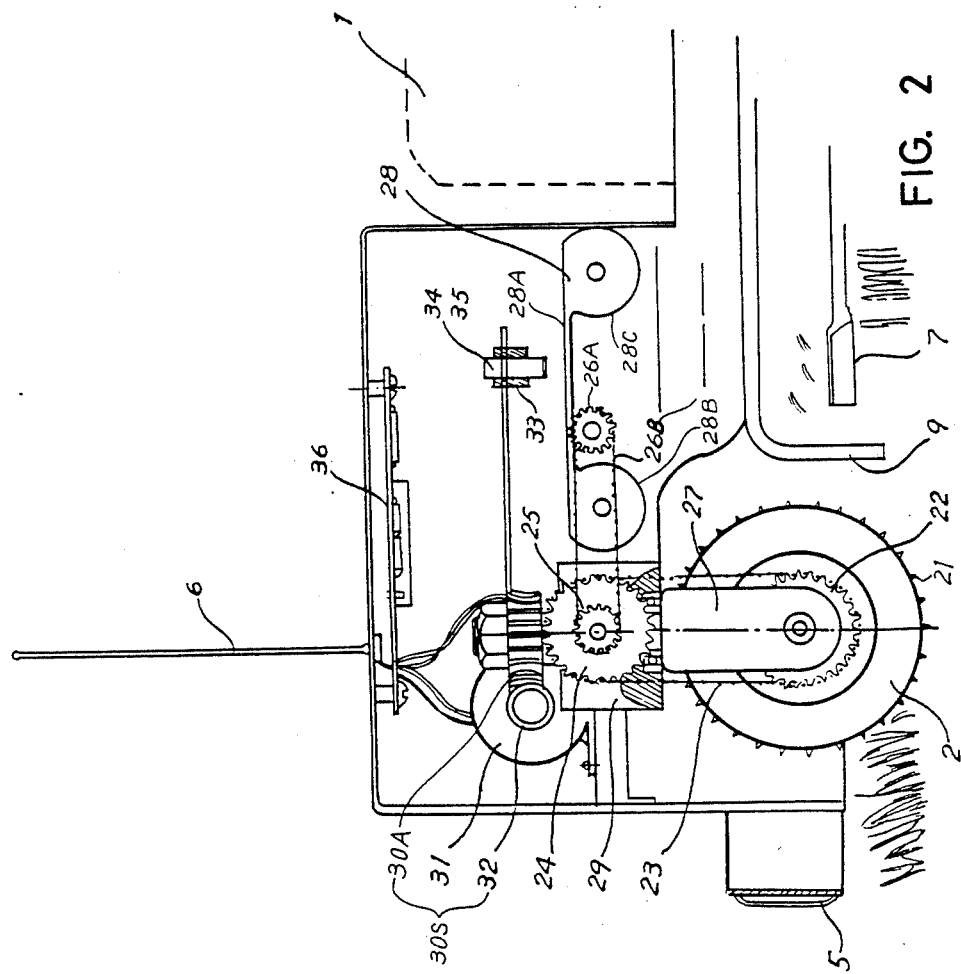
FIG. 2 is a schematic drawing of the embodiment of the robotic lawn mower of FIG. 1, showing the general construction of the control unit of the mower.

As shown in FIG. 2, control unit 4 includes a memory unit 28 which is preferably a paper tape cassette having a paper tape 28A wound around first and second reels 28B and 28C, paper tape 28A having a portion passing over a flat plate disposed between first and second reels 28B and 28C. Paper tape 28A is capable of reflecting light. A driving device is provided to advance the paper tape 28A when lead wheel 2 rotates. The driving device includes first sprocket 22 coaxially fixed onto lead wheel 2, a second sprocket 24 driven by the first sprocket 22 with a timing belt 23, a third sprocket 25 coaxially fixed onto the second sprocket 24, and a fourth sprocket 26A driven by the third sprocket 25 with another timing belt 26B. Fourth sprocket 26A advances and also controls the linear speed of paper tape 28A to synchronize the tape 28A with the rotational speed of lead wheel 2. Lead wheel 2 is rotatably supported by fork member 27 which is journaled onto a frame member 29 on which memory unit 28 is mounted. Timing belt 23 is so designed that it is allowed to twist when fork member 27 is caused to rotate to change the direction of lead wheel 2, without affecting the operation of the driving device.

Memory unit 28 also includes a writing device consisting of an arm member 30 having a first end fixedly mounted on an upper end of fork member 27 and a second end provided with a writing element 34, which may be a pen or pencil of black or dark color, to write on paper tape 28A. Steering unit 30S includes a worm wheel 30A fixedly mounted on the upper end of fork member 27 and an electric motor 31 provided with worm gear 32 for engaging with worm wheel 30A. Steering unit 30S is to operate fork member 27, or to steer lead wheel 2 with electric motor 31, which is controlled by a circuit 36 to be explained later. Writing element 34 is removably inserted into a receptacle 33 provided at the other second end of arm member 30.

Control unit 4 further includes a reading unit having an optical sensor 35 adapted to be selectively inserted in receptacle 33 in place of writing element 34 of the writing device, and a control circuit 36. Optical sensor 35 is capable of reading a mark on paper tape 28A to produce a certain signal to control circuit 36 which then delivers operational signals to electric motor 31 to steer leading wheel 2 accordingly.

The principles of recording, or the programming process, will be described below.

Figure 3:
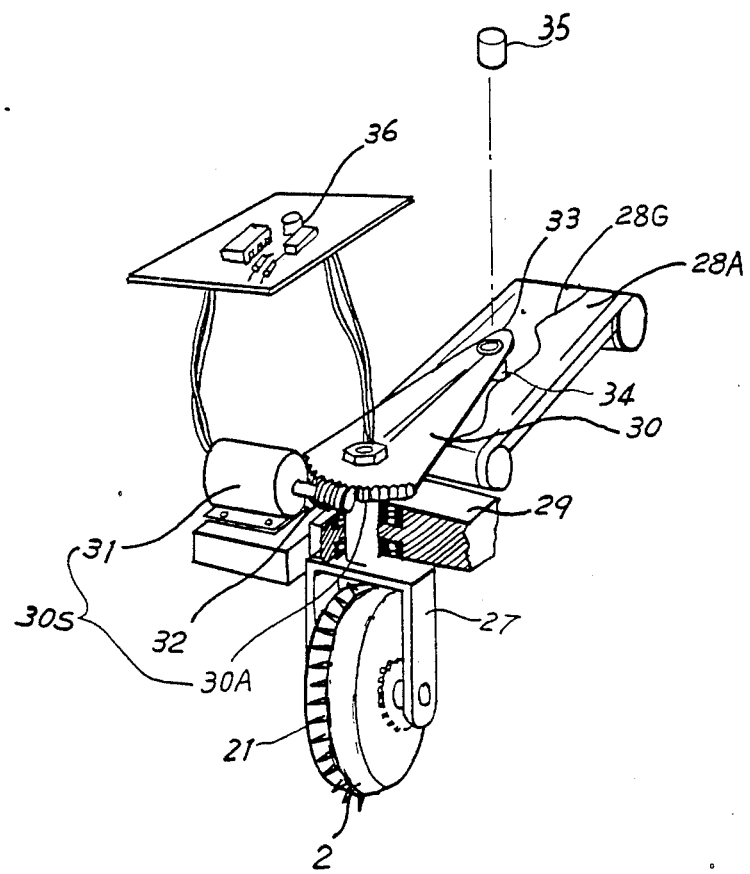
FIG. 3 is a schematic, perspective view of the memory unit of the robotic lawn mower of FIG. 1.

To carry out the programming process, writing element 34 is first inserted in receptacle 33 of arm member 30. Then the engine is started and the mower is maneuvered manually to travel along a certain route over the lawn to be mowed. While the mower travels, paper tape 28A of memory device 28 is caused to advance from second reel 28C to first reel 28B, allowing writing implement 34 of writing device to draw a line 28G on paper tape 28A, as shown in FIG. 3. Line 28G shows the mower traveling distance along the tape advancement direction, and also shows the lead wheel angle in the direction perpendicular to the tape advancement.

In order to prevent lead wheel 2 from slipping, lead wheel 2 is provided with a plurality of stings 21 extending from the periphery of lead wheel 2 as shown in FIG. 3.

Figure 4:
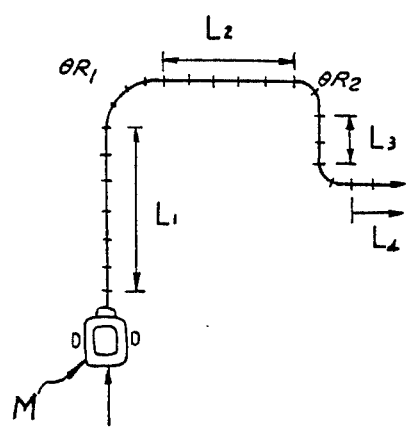
FIG. 4 is a schematic plan view of a route of travel of the mower to program to the robotic lawn mower of FIG. 1.
Figure 5:
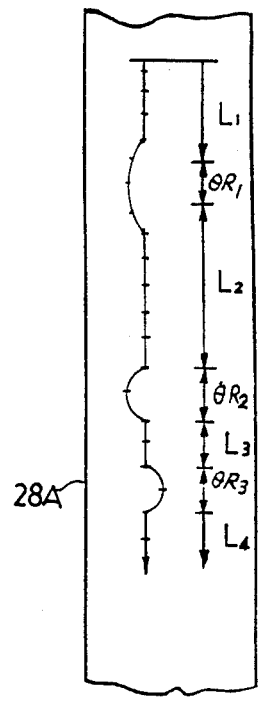
FIG. 5 is a schematic illustration of the recorded route on the memory device of FIG. 3, to correspond to the actual route of FIG. 4.

FIGS. 4 and 5 illustrate an example of the programming process. When the mower M, as shown in FIG. 4, moves along a straight course of length L1, a corresponding straight line L1 is drawn on the paper tape of the memroy device as shown in FIG. 5. When the mower M makes a right turn of an angle $\theta R1$ and then travels along a second straight course of length L2, a corresponding curve $\theta R1$ and a second straight line L2 are drawn on the paper accordingly. The same principles are followed to complete the recording of the intended route of travel of the mower, or the teaching of the mowing operation.

The principles of automatic mowing operation, or "play-back" operation, will now be described.

Figure 6:
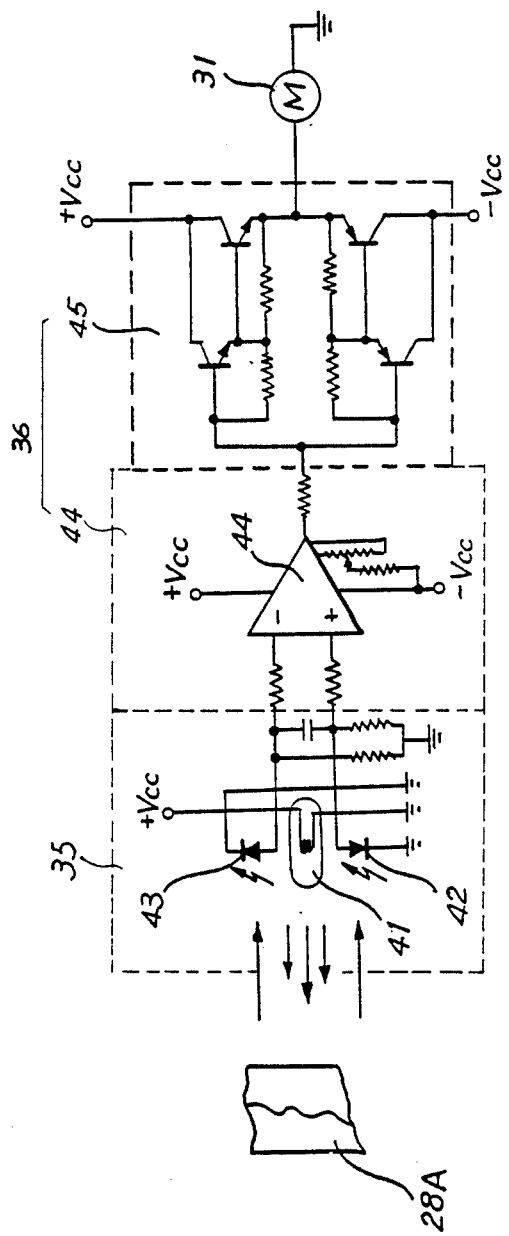
FIG. 6 is an electric circuit diagram of the control unit including a reading unit and a control circuit of the robotic lawn mower of FIG. 1.
Figure 7:
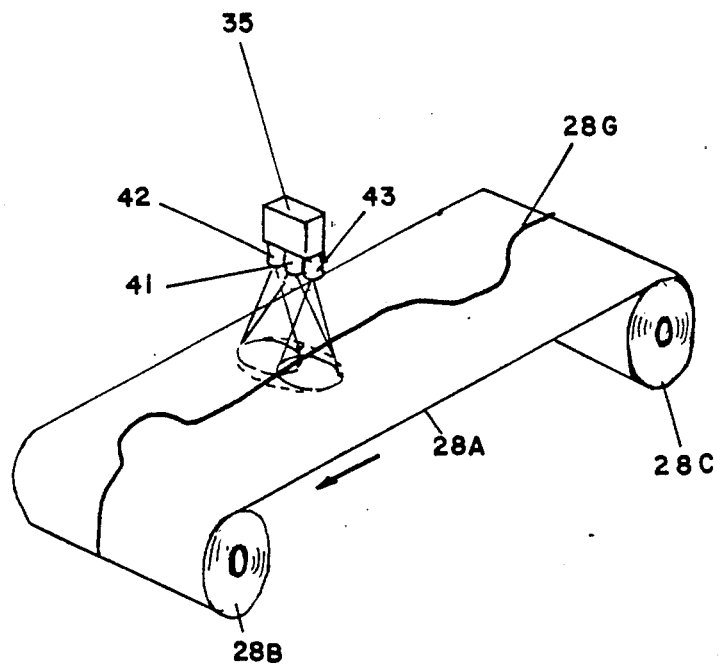
FIG. 7 is a schematic drawing showing the general arrangement of the optical sensor as the reading unit employed in the robotic lawn mower of this invention.

FIG. 6 shows an electric circuit diagram of the control unit including a reading unit 35 and a control circuit 36. Reading unit 35 is an optical sensor unit consisting of a light source 41, which may be a lamp or light emitting diode (LED), preferably a LED, a first photosensing cell 42 on one side of LED 41, and a second photosensing cell 43 on the opposite side of LED 41. Control circuit 36 consists of a comparator 44 and an amplifier 45.

In operation LED 41 casts light on to an area of the paper tape 28A. First photosensing cell 42 is adapted to detect the light reflected from paper tape 28A and deliver a first signal to comparator 44 (FIG. 6), while second photosensing cell 43 is adapted to detect the light reflected from paper tape 28A and deliver a second signal to comparator 44 to be compared with the first signal. As line 28G on paper tape 28A absorbs lights, it reduces current or voltage output of the photosensing cell closer to line 28G. The comparator 44 delivers an operation signal depending upon the difference between the first and second signals, the operation signal then being amplified by amplifier 45 and delivered to electric motor 31.

When the first signal is identical with the second signal, i.e., when line 28G is at the center between two photosensing cells 42 and 43, the lights received by two photosensing cells are balanced and there is no difference between the two signals and thus no operation signal will be delivered from comparator 44, as in the case when the reading device is reading a straight line from the intended route of travel recorded on paper tape 28A of the memory device, and electric motor 31 will not be energized. As a result the mower will keep moving along a straight line.

When one of the first signal and the second signal differs from the other, as in the case when the distances of the two photosensing cells 42 and 43 from line 28G are not equal, an operation signal corresponding to the difference between the two distances is produced by comparator 44. The operational signal is then amplified and delivered to electric motor 31, thus causing electric motor 31 to rotate and drive arm member 30 to move the two photosensing cells, so as to cause the two photosensing cells to deliver equal outputs again. At the same time the movement of arm member 30 also causes fork member 27 to rotate to steer lead wheel 2 to make a turn in the corresponding direction.

The operation of the reading unit, or optical sensor 35, in association with the steering device will be described in more detail with reference to FIGS. 8-13.

As shown in FIG. 8, when optical sensor 35 is reading a straight line L1 of the intended course recorded on paper tape 28A which moves in direction A relative to optical sensor 35, signals produced by first and second photosensing cells 42 and 43 are identical and no operation signals will be delivered to electric motor 31 (FIGS. 3 and 6); therefore lead wheel 2 remains in a straight-forward position. As shown in FIG. 9, as the mower travels to a point where the program shows that the mower should make a left turn, for example, paper tape 28A moves to such point that first photosensing cell 42 starts reading curve R of the route recorded on paper tape 28A, thereby causing first photosensing cell 42 to produce a signal different from that of second photosensing cell 43. As a result an operation signal is delivered from control circuit 36 (FIGS. 2 and 6) to electric motor 31, causing electric motor 31 to rotate in such a direction that lead wheel 2 is turned left, or in direction X, as shown in FIGS. 9 and 10. Arm member 30 (FIG. 3), which carries optical sensor 35, is also rotated together to shift the position of optical sensor 35 to follow line 28G. As shown in FIG. 11, two photosensing cells 42 and 43 trace line 28G to balance with each other, and the angle α of lead wheel 2 is determined. In the meantime the mower keeps making the left turn. As shown in FIG. 12, as the mower keeps moving, paper tape 28A keep moving in direction A relative to optical sensor 35. Now line 28G leans more to second photosensing cell 43. That causes second photosensing cell 43 to produce less output than first photosensing cell 42. The difference between the outputs from the two photosensing cells causes control circuit 36 (FIG. 5) to deliver a new operational signal to electric motor 31 to cause electric motor 31 to rotate in an opposite direction. As a result lead wheel 2 is caused to turn in a reversed direction, or to make a "return". As shown in FIG. 13, as soon as lead wheel 2 returns to the original straight forward position, arm member 30 (FIG. 3), which carries optical sensor 35, also returns to its original position, as the mower has completed its turning operation and continues to move straight forward.

Figure 14:
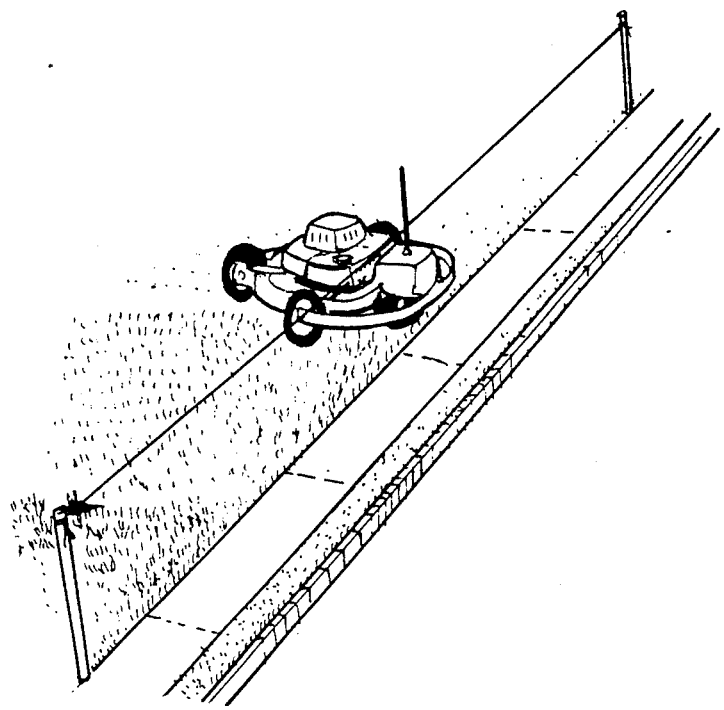
FIG. 14 is a schematic drawing showing how the antenna type safety device operates.

To prevent any accident from occurring, which might involve children playing, moving subjects, or standing obstacles, the robotic lawn mower of this invention is equipped with safety devices, as shown in FIG. 1 and FIG. 2, including a bumper member 5 which is very similar to most automatic guided vehicle applications, and an elongated bar member 6 which is like a rod antenna. Both provide a switching means for emergency shutting-off of the ignition system of the engine. They also activate a brake to stop the operation of the machine, and generate a sound alarm and a warning light to call for help. The mower will not start again until the object is removed and the mower manually reinitialized. The rod antenna type safety device is very useful in limiting the accessible area of the robotic mower. Some lawns may lie right on a busy street and may not have fences separating the lawns and the street. A wire or a rope temporarily set up along the lawn boundary could prevent the robotic mower from erroneously running into the street as shown in FIG. 14. With the combination of the bumper and the antenna safety devices, the robotic mower can be operated safely without human attendance.

One of the most difficult problems for the robotic mower, a problem similar to the development of automated guided vehicles, is the tracking problem—following the prescribed path. Error is mainly caused by slippage between the wheel and the ground. The robotic mower of this invention has a unique wheel system arrangement. The lead wheel 2 and the rear wheel 3 have a sting ring as shown in FIGS. 1, 2 and 3. The sting can be engaged into the ground. This limits the wheel movement to only one degree of freedom, i.e., either rolling forward or rolling backward without slippage. The sting ring also helps healthy grass growth.

Rear wheel 3 is the drive wheel. It is powered by the engine (or motor) through a transmission box with suitable speed reduction and directional adjustment. The sting annulus can help the tracking and reduce slippage and power loss.

Front wheel 2 is the driven wheel, which rotates passively as the mower moves forward. The rotation of the front wheel causes the advance of the paper tape through the timing belts. The front wheel is also a steering wheel, through the swing angle to set the turning of the mower. The sting annulus on front wheel 2 not only helps to hold better on the ground, but also accurately controls the advancement of the recording tape.

Both front wheel 2 and rear wheel 3 assume the majority of weight of the lawn mower. The course of the mower movement is determined by the distance between these two wheels and their relative angle.

The robotic lawn mower can have either one or two side wheels. In the case of two side wheels, the four wheels of the mower are located at the corners of a rhomb as shown in FIG. 1. The side wheels are spring supported for self height adjustment so that the front wheel and the rear wheel are always in contact with the ground and assume the majority of the load. In the case of one side wheel, the mower is stable and less affected by the flatness of the lawn surface because of the advantage of a three point setting in a plane in geometry.

The side wheel is an idle wheel, mainly for balancing the mower and assuming some load. It does not matter whether it has sting annulus on it because it is not concerned with slippage. While operating, no matter whether the mower goes straight or makes turns, the front wheel and rear wheel are expected to always rotate at the same speed. However the speed of the side wheel is self adjustable, depending on the radius difference of the turn.

The wheel design with sting, the functional assignment of each wheel, and the geometrical layout of the wheels make this wheel system very special and provide unbeatable tracking capability over other available arrangements.

The robotic lawn mower of this invention can also be operated manually, as described below.

The manual operation of this automatic lawn mower is different from operating a push/walk-behind lawn mower or a riding mower (tractor). The maneuverability of the mower is controlled by a hand unit for programming and for manual control. The hand unit may have push button switches to control two motors (D.C. streeting Motor 31 and engine starting motor), the clutch, and emergency stop devices through a multiple wire cable or by radio signals. Thus the operator does not need to follow and push the mower as most walk behind type mowers, neither does the operator need to turn the steering wheel as in the case of riding mowers. The operator can precede, walk behind, or stand on the side of the mower as desired. After the mower starts and moves forward, the operator pushes the appropriate button on the hand unit to control the rotational direction of steering motor 31. Motor 31 then makes fork member 27 swing through worm 32 and gear segment 30A on arm member 30. Front wheel 2 on fork member 27 thus turns at an angle to lead the mower to make turns. In this way the mower can be manipulated to run all over the lawn to be mowed. As the mower moves forward, making left or right turns on the lawn, high grass is cut to an uniform height by rotating cutting blades 7 under the mower chasis.

The principles of automatic operations of the robotic lawn mower of this invention are further emphasized as follows.

The automatic lawn mower of this invention can be programmed to follow a mowing path. The programming process is for the mower to store the mowing path. It is similar to the manual operation described in the previous paragraph except that a blank memory tape cassette 28 and writing elements 34 are mounted in place before starting the mower. As in manual operations, front wheel 2 rotates passively as rear wheel 3 drives the mower. This rotation motion is transmitted to the tape advancement through two timing belts 23, 26 and four sprockets 22, 24, 25 and 26. The linear speed of paper tape 28A is thus proportional to the linear travel of front wheel 2. Writing element 34 is inserted in receptacle 33 on arm member 30 during the programming process; it can move in the transverse direction of memory tape 28A advancement as arm member 30 swings when front wheel 2 rotates at an angle to make a turn. Writing element 34 therefore makes markings of a line or a continuous curve on a paper tape 28A. This line or curve indicates the travel of front wheel 2 in the direction of the tape advancement, and indicates the angle of front wheel 2 in the transverse direction.

Using the hand unit, the operator controls the mower to move all over the lawn during this process, the traveling distance and turning angles are recorded as a continuous curve on the memory tape 28A, i.e., the history of the mowing path in the memory of the automatic lawn mower.

The programming process is for mowing the lawn manually for the first time with writing element 34 and memory tape 28A working inside the mower. After rewinding the memory tape, the programming process is completed.

Automatic lawn mowing is a repeat of manual mowing operation in the programming process. Writing element 34 used in the programming process is replaced by a reading unit (Optical sensor) 35 in the automatic mode operation. With the same initial setup (position & direction) as in the programming process, the mower of this invention is started and moves forward. As the mower moves forward and cuts the grass, memory tape 28A is driven forward through the relationship of front wheel rotation, timing belt and driving mechanism. Reading element 35 (optical sensor) has the capability to trace curve 28G on memory tape 28. This is done because the control circuit drives steering motor 31 to swing arm member 30 where the optical sensors seat. Any deviation of the sensor scanning area from line 28G will result in elecrical voltage for motor 31 driving arm member 30 back to follow pre-recorded line 28G. Note that front wheel 2 is steered with arm member 30 as an integral part. That means the swing angle of the front wheel is controlled by the pre-recorded curve. The mower repeats the pre-programmed route after a series of instructions: how long to travel and what angle to turn,—etc.; and finally mows over the entire lawn area. During the automatic mowing process, attendence by an operator is not required. The safety devices will stop the running of the mower and signal the operator for help in case something happens.

Figure 15:
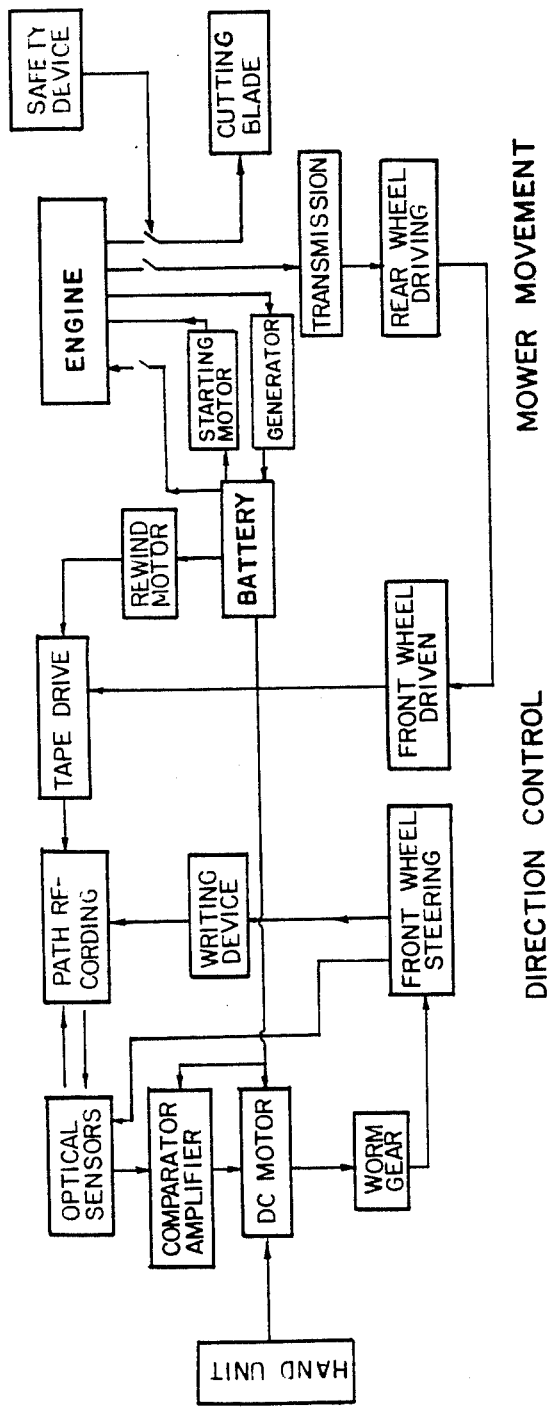
FIG. 15 is a block diagram showing the principles of operation of the robotic lawn mower of this invention.

In conclusion, the robotic lawn mower of this invention, of which the entire concept is shown in the block diagram in FIG. 15, consists of an internal combustion engine as a power unit which drives a mowing cutter and the mower itself through a reduction gear set and a drive wheel, an alternator to be used as a generator and as a starting motor, a storage battery, a lead wheel for guiding the movement of the mower; a control unit for controlling the movement of the mower, the control unit including a paper tape device operable in association with the lead wheel, a writing member for recording a teaching on the paper tape device, an optical reading unit for reading the teaching i.e., the recording from the paper tape device, a comparator-amplifier unit for producing an operation signal in response to the reading of the optical reading unit, an electric motor operable by the operation signals for controlling the steering angle of the lead wheel, a worm gear and worm wheel set for transferring the power from the electric motor to the lead wheel to cause the lead wheel to change its steering angle.

While a preferred embodiment of the robotic lawn mower of this invention has been described and illustrated, it is to be understood that certain modifications are possible by persons skilled in the art without departing from the principles of this invention. For example, the timing belts can be replaced by chains, and the arm member that carries the writing device or the reading unit can be coupled to the fork member with an appropriate gear trains or the like. Therefore, the scope and spirit of this invention are to be defined by the appended claims.

What is claimed is:

1. A lawnmower, comprising:
   a power unit;
   a drive wheel operatively coupled to said power unit for propelling said lawn mower;
   a lead wheel for guiding said lawnmower to move along a route of travel, said lead wheel being rotatably mounted on a fork member which is rotatably attached to said lawnmower;
   a control unit including a memory unit for storing said route of travel, said memory unit including a paper tape to be advanced in proportion with the rotation of said lead wheel and a writing device for recording said route of travel on said paper tape, said writing device having an arm member operatively connected to said fork member, said control unit also including a reading unit for reading said route of travel recorded in said memory unit and producing control signals according to said route of travel, and a control circuit for producing operation signals; and
   a steering unit operable by said operational signals for steering said lead wheel to guide said lawnmower to travel along said route of travel.

2. A lawn mower as recited in claim 1, wherein said arm member is provided with a receptacle in which said writing device and said reading unit are selectively and removably mounted.

3. A lawn mower as recited in claim 1, wherein:
   said reading unit contains a light source diode (LED), a first photosensing cell at one side of said light source and a second photosensing cell at the opposite side of said light source.

4. A lawn mower as recited in claim 3, wherein said control circuit comprises a comparator for comparing first signals delivered from said first photosensing cell and second signals delivered from said second photosensing cell, and said operational signal is produced by said comparator upon comparing said first signals and said second signals.

5. A lawn mower as recited in claim 4, wherein said control circuit further includes an amplifier for amplifying said operational signal before said operation signal is delivered to said steering unit.

6. A lawn mower as recited in claim 5, wherein said steering unit comprises an electric motor mounted onto a frame member of said lawn mower, a worm gear driven by said electric motor, and a worm wheel fixedly mounted on said fork member, said worm gear being engaged with said worm wheel.

7. A lawn mower as recited in claim 1, which further comprise a safety device capable of causing said power unit to become inoperable when said safety device comes into contact with a foreign object during the mowing operation of said lawn mower.

8. The lawn mower as recited in claim 7, wherein said safety device includes an longated bar member extending from said lawn mower and a switch device operable by said bar member, said switch device being capable of turning off said power unit when operated by said bar member.

9. The lawn mower as recited in claim 1, wherein said lead wheel in provided with a plurality of stings extending from the periphery of said lead wheel.

* * * * *